(12) United States Patent
Worsley et al.

(10) Patent No.: US 9,087,625 B2
(45) Date of Patent: *Jul. 21, 2015

(54) MECHANICALLY STIFF, ELECTRICALLY CONDUCTIVE COMPOSITES OF POLYMERS AND CARBON NANOTUBES

(75) Inventors: Marcus A. Worsley, Hayward, CA (US); Sergei O. Kucheyev, Oakland, CA (US); Theodore F. Baumann, Discovery Bay, CA (US); Joshua D. Kuntz, Livermore, CA (US); Joe H. Satcher, Jr., Patterson, CA (US); Alex V. Hamza, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 867 days.

This patent is subject to a terminal disclaimer.

(21) Appl. No.: 13/281,160

(22) Filed: Oct. 25, 2011

(65) Prior Publication Data
US 2012/0037854 A1     Feb. 16, 2012

Related U.S. Application Data

(63) Continuation of application No. 12/761,157, filed on Apr. 15, 2010, now abandoned, and a continuation-in-part of application No. 12/652,616, filed on Jan. 5, 2010, now Pat. No. 8,685,287, and a (Continued)

(51) Int. Cl.
*B82B 3/00* (2006.01)
*C01B 31/02* (2006.01)
*H01B 1/24* (2006.01)
*B82Y 30/00* (2011.01)
*C08K 3/04* (2006.01)
*C08K 7/24* (2006.01)

(52) U.S. Cl.
CPC . *H01B 1/24* (2013.01); *B82Y 30/00* (2013.01); *C08K 3/04* (2013.01); *C08K 7/24* (2013.01)

(58) Field of Classification Search
CPC .............. H01B 1/04; B82B 3/00; B82Y 3/00; B82Y 4/00
USPC ........ 252/500–519.1; 977/734, 742, 783, 788
See application file for complete search history.

(56) References Cited

U.S. PATENT DOCUMENTS 5,260,855 A    11/1993   Kaschmitter et al.
5,409,683 A    4/1995    Tillotson et al.

(Continued)

FOREIGN PATENT DOCUMENTS

WO    WO 2008000163 A1 *  1/2008  .............. C01B 31/02

OTHER PUBLICATIONS

Coleman et al. ("Small but strong: A review of the mechanical properties of carbon nanotube—polymer composites." Carbon, 44, pp. 1624-1652, 2006).*

(Continued)

*Primary Examiner* — Tri V Nguyen
(74) *Attorney, Agent, or Firm* — Foley & Lardner LLP

(57) ABSTRACT

Using SWNT-CA as scaffolds to fabricate stiff, highly conductive polymer (PDMS) composites. The SWNT-CA is immersing in a polymer resin to produce a SWNT-CA infiltrated with a polymer resin. The SWNT-CA infiltrated with a polymer resin is cured to produce the stiff and electrically conductive composite of carbon nanotube aerogel and polymer.

12 Claims, 3 Drawing Sheets

Related U.S. Application Data continuation-in-part of application No. 12/694,425, filed on Jan. 27, 2010, now abandoned.

(60) Provisional application No. 61/172,363, filed on Apr. 24, 2009, provisional application No. 61/147,694, filed on Jan. 27, 2009, provisional application No. 61/147,805, filed on Jan. 28, 2009.

(56) References Cited

U.S. PATENT DOCUMENTS

| | | | |
|---|---|---|---|
| 5,601,938 | A | 2/1997 | Mayer et al. |
| 6,500,401 | B2 | 12/2002 | Reznek et al. |
| 6,653,356 | B2 | 11/2003 | Sherman |
| 6,809,060 | B2 | 10/2004 | Suh et al. |
| 6,843,919 | B2 | 1/2005 | Klabunde et al. |
| 6,906,003 | B2 | 6/2005 | Struthers et al. |
| 6,986,818 | B2 | 1/2006 | Tillotson et al. |
| 7,005,401 | B2 | 2/2006 | Lu et al. |
| 7,074,880 | B2 | 7/2006 | Rhine et al. |
| 7,256,147 | B2 | 8/2007 | Yamada et al. |
| 7,270,851 | B2 | 9/2007 | Sullivan |
| 7,282,466 | B2 | 10/2007 | Long et al. |
| 7,378,450 | B2 | 5/2008 | Erkey et al. |
| 7,410,718 | B2 | 8/2008 | Cooper et al. |
| 7,442,747 | B1 | 10/2008 | Long et al. |
| 7,780,875 | B2 | 8/2010 | Asgari |
| 2002/0094426 | A1 | 7/2002 | Stepanian et al. |
| 2003/0092342 | A1* | 5/2003 | Tennent et al. ............ 442/349 |
| 2004/0176643 | A1 | 9/2004 | Sato et al. |
| 2006/0293434 | A1 | 12/2006 | Yodh et al. |
| 2007/0292732 | A1 | 12/2007 | Feaver et al. |
| 2009/0117467 | A1* | 5/2009 | Zhamu et al. ............ 429/231.8 |
| 2009/0185327 | A1 | 7/2009 | Seymour |
| 2009/0229032 | A1 | 9/2009 | Stepanian et al. |
| 2009/0317619 | A1 | 12/2009 | Di Monte et al. |
| 2010/0028634 | A1 | 2/2010 | Turevskaya et al. |
| 2010/0075024 | A1 | 3/2010 | Ajayan et al. |
| 2010/0139823 | A1 | 6/2010 | Gash et al. |
| 2010/0314586 | A1* | 12/2010 | Hong et al. ............ 252/511 |

OTHER PUBLICATIONS

U.S. Appl. No. 61/172,363, filed Apr. 24, 2009, Worsley et al.
U.S. Appl. No. 12/652,616, filed Jan. 5, 2009, Worsley et al.
U.S. Appl. No. 12/694,425, filed Jan. 27, 2010, Worsley et al.
U.S. Appl. No. 13/051,915, filed Mar. 18, 2011, Worsley et al.
U.S. Appl. No. 13/281,185, filed Oct. 25, 2011, Worsley et al.

Poole, C.P., Jr. et al. "Carbon Nanostructures", in *Introduction to Nanotechnology*. John Wiley & Sons, 2003, pp. 103-132.

Worsley, M. et al. "Mechanically robust and electrically conductive carbon nanotube foams". Applied Physics Letters, 94, 2009, 073115.

Worsley, M. et al. "Properties of single-walled carbon nanotube-based aerogels as a function of nanotube loading". Acta Materialia, 57, 2009, pp. 5131-5136.

Worsley, M. et al. "Stiff and electrically conductive composites of carbon nanotube aerogels and polymers". J. Mater. Chem., 19, 2009, pp. 3370-3372.

Bryning, M.B. "Carbon Nanotube Aerogels". Advanced Materials, 19, 2007, pp. 661-664.

Bordjiba, T. "New Class of Carbon-Nanotube Aerogel Electrodes for Electrochemical Power Sources". Advanced Materials, 20, 2008, pp. 815-819.

Kucheyev, S.O. "Depth-Sensing Indentation of Low-Density Brittle Naoporous Solids." Acta Materialia, 57, 2009, pp. 3472-3480.

Pekala, R.W. et al. "Carbon Aerogels for Electrochemical Applications". Journal of Non-Crystalline Solids, 225, 1998, pp. 74-80.

Maldonado-Hodar, F.J. et al. "Metal-Carbon Aerogels as Catalysts and Catalyst Supports". Studies in Surface Science and Catalysis, 130, 2000, pp. 1007-1012.

Hwang, S.W. et al. "Synthesis and Characterization of Tin Oxide/Carbon Aerogel Composite Electrodes for Electrochemical Supercapacitors". Journal of Power Sources, 172, 2007, pp. 451-459.

Petricevic, R. et al. "Planar Fibre Reinforced Carbon Aerogels for Application in PEM Fuel Cells". Carbon, 39, 2001, pp. 857-867.

Worsley, M. et al. "Synthesis and Characterization of Nanocarbon-Supported Titanium Dioxide". Mater. Res. Soc. Proc. vol. 1174, 2009.

Worsley, M. et al. "High Surface Area Carbon Nanotube-Supported Titanium Carbonitride Aerogels". J. Mater. Chem., 19, 2009, pp. 5503-5506.

Worsley, M. et al. "Route to High Surface Area TiO2/C and TiCN/C Composites". J. Mater. Chem., 19, 2009, pp. 7146-7150.

Becker, O., et al., "Layered Silicate Nanocomposites Based on Various High-Functionality Epoxy Resins: The Influence of Cure Temperature on Morphology, Mechanical Properties, and Free Volume", Macromolecules, 2003, pp. 1616-1625, vol. 36, published Feb. 7, 2008.

Lee, S.W., et al., "Shrinkage ratio of PDMS and its alignment method for the wafer level process", Microsyst Technol, 2008, pp. 205-208, vol. 14, published online May 12, 2007.

US Office Action received in related U.S. Appl. No. 12/761,157 dated Aug. 30, 2012.

* cited by examiner

MECHANICALLY STIFF, ELECTRICALLY CONDUCTIVE COMPOSITES OF POLYMERS AND CARBON NANOTUBES

CROSS-REFERENCE TO RELATED APPLICATIONS

The present application is a continuation application of U.S. application Ser. No. 12/761,157, filed Apr. 15, 2010, which claims benefit under 35 U.S.C. 119(e) of U.S. Provisional Patent Application No. 61/172,363 filed Apr. 24, 2009 entitled "Route to mechanically stiff, electrically conductive composites of polymers and carbon nanotubes," the disclosure of which is hereby incorporated by reference in its entirety for all purposes.

The present application is also a continuation-in-part application of U.S. application Ser. No. 12/652,616, filed Jan. 9, 2010, which claims benefit under 35 U.S.C. 119(e) of U.S. Provisional Patent Application No. 61/147,694 filed Jan. 27, 2009 entitled "Mechanically Robust, Electrically Conductive Ultralow-Density Carbon Nanotube-Based Aerogels," the disclosure of which is hereby incorporated by reference in its entirety for all purposes.

The present application is also a continuation-in-part application of U.S. application Ser. No. 12/694,425, filed Jan. 27, 2010, which claims benefit under 35 U.S.C. 119(e) of U.S. Provisional Patent Application No. 61/147,805 filed Jan. 28, 2009 entitled "High Surface Area, Electrically Conductive Nanocarbon-Supported Metal Oxide," the disclosure of which is hereby incorporated by reference in its entirety for all purposes.

STATEMENT AS TO RIGHTS TO INVENTIONS MADE UNDER FEDERALLY SPONSORED RESEARCH AND DEVELOPMENT

The United States Government has rights in this invention pursuant to Contract No. DE-AC52-07NA27344 between the United States Department of Energy and Lawrence Livermore National Security, LLC for the operation of Lawrence Livermore National Laboratory.

BACKGROUND

1. Field of Endeavor

The present invention relates to and more particularly to a composite of polymers and carbon nanotubes, and more particularly, to a mechanically stiff, electrically conductive composites of polymers and carbon nanotubes.

2. State of Technology

The treatise, *Introduction to Nanotechnology*, by Charles P. Poole, Jr., and Frank J. Owens, John Wiley &. Sons, 2003, states: "Nanotechnology is based on the recognition that particles less than the size of 100 nanometers (a nanometer is a billionth of a meter) impart to nanostructures built from them new properties and behavior. This happens because particles which are smaller than the characteristic lengths associated with particular phenomena often display new chemistry and physics, leading to new behavior which depends on the size. So, for example, the electronic structure, conductivity, reactivity, melting temperature, and mechanical properties have all been observed to change when particles become smaller than a critical size."

Carbon nanotubes (CNTs) possess a number of intrinsic properties that make them promising candidates as filler material in the design of new composite systems. CNTs can have electrical conductivities as high as $1\times10^6$ S m$^{-1}$, thermal conductivities as high as 3000 W m$^{-1}$ K$^{-1}$, elastic moduli of the order of 1 TPa, and are extremely flexible. Unfortunately, the realization of these properties in macroscopic forms, such as conductive polymer/CNT composites, has been limited. In these composites, CNTs are typically dispersed throughout the polymeric matrix by addition of the individual nanotubes or bundles to precursor formulations. Since the loading levels and distribution of the CNTs in the polymer determine the conductivity of the composite, one of the challenges associated with the fabrication of conductive polymer composites is attaining uniform dispersion of the CNTs within the matrix. In addition, dispersion methods can vary greatly depending on the characteristics of matrix material. While measurable increases in electrical conductivity can be achieved through addition of as little as 0.007 wt % CNTs to polymer matrices, preparation of composites with conductivities >1 S cm$^{-1}$ requires either higher loadings of CNTs (>10 wt %) or specially-designed CNTs that facilitate dispersion in the matrix. Thus, the fabrication of CNT-polymer composites with conductivities on par with highly conductive semiconductors and metals for applications such as electromagnetic interference shielding can be an expensive endeavor. An attractive alternative to the dispersion approach for the design of conductive polymer composites would be the use of a low-density, electrically conductive CNT foam as a scaffold that can be filled or infiltrated with the polymer matrix. With this approach, the uniformity of the dispersed phase, and hence the conductivity of the composite, is established by the pre-formed CNT network of the scaffold. In addition, this approach could be general and utilized with a wide variety of polymer matrices.

SUMMARY

Features and advantages of the present invention will become apparent from the following description. Applicants are providing this description, which includes drawings and examples of specific embodiments, to give a broad representation of the invention. Various changes and modifications within the spirit and scope of the invention will become apparent to those skilled in the art from this description and by practice of the invention. The scope of the invention is not intended to be limited to the particular forms disclosed and the invention covers all modifications, equivalents, and alternatives falling within the spirit and scope of the invention as defined by the claims.

Many challenges remain in the effort to realize the exceptional mechanical and electrical properties of carbon nanotubes in composite materials. Applicants have developed highly electrically conductive and mechanically stiff composites of polymers and single-walled carbon nanotubes (SWNT). Conductive SWNT-based nanofoams (aerogels) are used as scaffolds to create polymer [poly(dimethylsiloxane)] composites. The resulting composites possess electrical conductivities over 1 S cm$^{-1}$ and exhibit an ~300% increase in the elastic modulus with as little as 1 vol % nanotube content.

DEFINITION OF TERMS

Various terms used in this patent application are defined below.
CA=Carbon Aerogel
CNT=Carbon Nanotubes
CA-CNT=Carbon Aerogel & Carbon Nanotube Composite
Nanofoam=Aerogel
SWNT=Single-Walled Carbon Nanotubes
DWNT=Double-Walled Carbon Nanotubes SDBS=Sodium Dodecylbenzene Sulfonate
MESOPORPOUS=Pore Dia. 2 & 5 mm
PVA=Polyvinyl Alcohol
CVD=Chemical Vapor Deposition
TEM=Transmission Electron Microscopy
SEM=Scanning Electron Microscopy
R/C=Resorcinol to Catalyst Ratios
RF=Resorcinol and Formaldehyde Solids
BET=Brunauer-Emmett-Teller
Mechanically Robust=Can withstand strains greater than 10% before fracture
Electrically Conductive=Exhibits an electrical conductivity of 10 S/m or greater
Mechanically Stiff=Elastic modulus greater than 10 MPa
Ultralow-Density=Exhibits densities less than 50 mg/cc
Carbon Nanotube-Based Aerogel=Porous carbon material consisting of 5 to 95% carbon nanotubes by weight
SWNT-CA=Single-Walled Carbon Nanotubes/Carbon Aerogel
PDMS/SWNT-CA=Polydimethylsiloxane (PDMS)/Single-Walled Carbon Nanotubes/Carbon Aerogel Applicants used SWNT-CAs as scaffolds to fabricate stiff, highly conductive polymer (PDMS) composites via the infiltration method with little to no degradation of the conductive network of the CNT-based scaffold. Conductivities as high as 1 S cm$^{-1}$ have been observed for SWNT loadings as low as 1 vol % (1.2 wt %) in polymer/SWNT-CA composites. In addition to excellent electrical conductivity, the polymer composite exhibited an ~300% increase in Young's modulus, producing not only a highly conductive, but a stiffer composite as well. The exceptional properties of this polymer composite and the general nature of the fabrication method provide the potential for a whole new class of composites based on the SWNT-CA scaffold.

The invention is susceptible to modifications and alternative forms. Specific embodiments are shown by way of example. It is to be understood that the invention is not limited to the particular forms disclosed. The invention covers all modifications, equivalents, and alternatives falling within the spirit and scope of the invention as defined by the claims.

BRIEF DESCRIPTION OF THE DRAWINGS

The accompanying drawings, which are incorporated into and constitute a part of the specification, illustrate specific embodiments of the invention and, together with the general description of the invention given above, and the detailed description of the specific embodiments, serve to explain the principles of the invention.

DETAILED DESCRIPTION OF SPECIFIC EMBODIMENTS

Figure 1A:
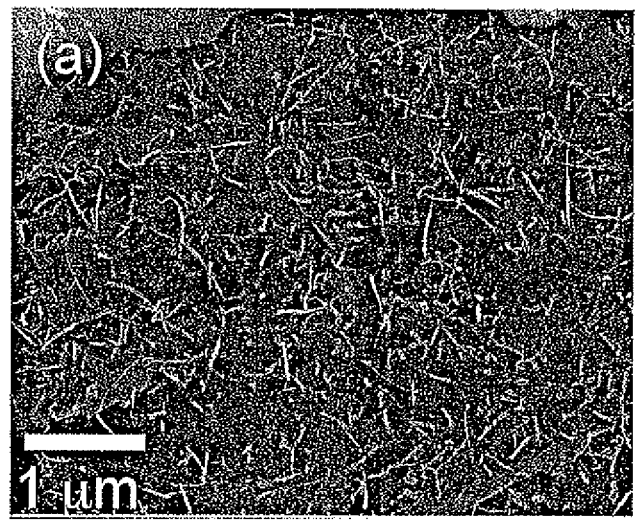
FIGS. 1A, 1B, 1C, and 1D are SEM images under different magnifications of conductive PDMS/SWNT-CA composites.

Referring to the drawings, to the following detailed description, and to incorporated materials, detailed information about the invention is provided including the description of specific embodiments. The detailed description serves to explain the principles of the invention. The invention is susceptible to modifications and alternative forms. The invention is not limited to the particular forms disclosed. The invention covers all modifications, equivalents, and alternatives falling within the spirit and scope of the invention as defined by the claims.

Applicants synthesized ultralow-density SWNT-based foams (SWNT-CA) with exceptional electrical and mechanical properties. In these foams, carbon nanoparticles were used as a binder to crosslink randomly oriented bundles of single-walled CNTs. These SWNT-CAs simultaneously exhibited increased stiffness and high electrical conductivity even at densities approaching 10 mg cm$^{-3}$. The foams are stable to temperatures approaching 1000° C. and have been shown to be unaltered by exposure to extremely low temperatures during immersion in cryogenic liquids (such as liquid hydrogen). Therefore, in addition to use as catalyst supports, sensors, and electrodes, these ultra-light and robust foams can serve as scaffolds for the preparation of novel CNT composites. As the conductive network is already established, the CNT foam can simply be impregnated through the wicking process with the matrix of choice, ranging from inorganic sols to polymer melts to ceramic pastes, to prepare a variety of conductive CNT composites. Applicants used SWNT-CA foam scaffolds for the synthesis of a highly conductive poly (dimethylsiloxane) (PDMS) composite. This polymer composite exhibits ~300% increase in the elastic modulus relative to the unloaded PDMS elastomer and electrical conductivity over 1 S cm$^{-1}$, the highest conductivity reported for a polymer/SWNT composite at this CNT loading level (1.2 wt % or 1 vol %).

Method of Preparation

SWNT-CA nanofoams, with a SWNT loading of 55 wt % (1 vol %) and a monolith density of 28 mg cm$^{-3}$, were prepared as described in:

(1) Co-Pending patent application Ser. No. 12/652,616 titled "Mechanically Robust, Electrically Conductive Ultralow-Density Carbon Nanotube-Based Aerogels," filed Jan. 5, 2009 which is incorporated herein in its entirety by this reference;

(2) the journal article, "Mechanically robust and electrically conductive carbon nanotube foams," by Marcus A. Worsley, Sergei O. Kucheyev, Joe H. Satcher, Jr., Alex V. Hamza, and Theodore F. Baumann, in APPLIED PHYSICS LETTERS 94, 073115(2009) which is incorporated herein in its entirety by this reference; and (3) "Properties of single-walled carbon nanotube-based aerogels as a function of nanotube loading,) by Marcus A. Worsley, Peter J. Pauzauskie, Sergei O. Kucheyev, Joseph M. Zaug, Alex V. Hamza, Joe H. Satcher Jr., and Theodore F. Baumann, in Acta Materialia 57 (2009) 5131-5136, which is incorporated herein in its entirety by this reference.

Once the SWNTs are dispersed, organic sol-gel chemistry is used crosslink the CNT bundles. Typically, organic sol-gel chemistry involves the polymerization of organic precursors to produce highly crosslinked organic gels that can be dried and pyrolyzed to yield porous carbon structures. In this case, low concentrations of the sol-gel precursors (resorcinol, formaldehyde) and catalyst (sodium carbonate) are added to the CNT suspension to induce polymerization primarily on the walls of the CNT bundles and, more importantly, at the junctions between adjacent bundles to form an organic binder.

The resulting gel is then dried and subsequently pyrolyzed to convert the organic binder to carbon, yielding the SWNT-CA nanofoam. The volume percent of SWNTs in each sample was calculated from the initial mass of SWNTs added, a CNT density of 1.3 g cm$^{-3}$, and the final volume of the sample. The synthesis process for the SWNT-CA allows for a range of possible shapes and sizes. SWNT-CA right cylinders with diameters of ~1 cm and heights of ~2 cm have been fabricated.

Composites were prepared by immersing the as-prepared SWNT-CA in the polymer resin prior to cure. The immersed SWNT-CA is placed under vacuum until no more air escaped from the scaffold, suggesting full infiltration of the resin. The infiltrated SWNT-CA is then cured at 60° C. to produce the composite. The dimensions of the composite are approximately equal to those of the initial SWNT-CA.

Figure 1B:
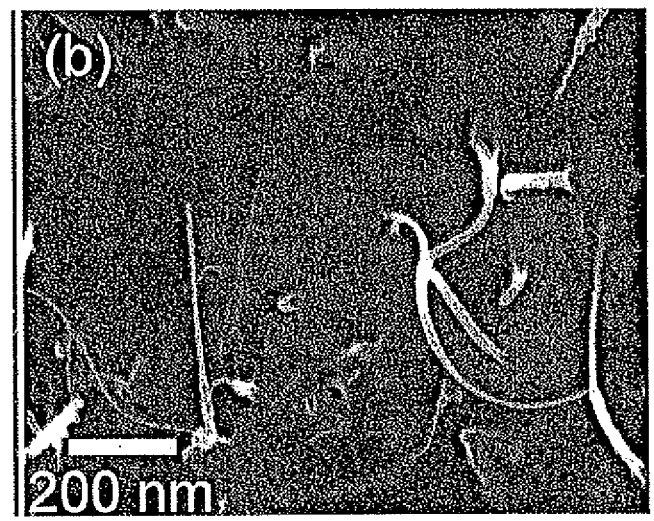

Referring now to the drawings and in particular to FIGS. 1A, 1B, 1C, and 1D, scanning electron microscopy (SEM) images of PDMS/SWNT-CA composites show that the SWNTs are homogenously distributed throughout the polymer matrix, suggesting that there is good wetting at the PDMS/SWNT-CA interface and that the CNT-based scaffold is intact after infiltration and curing. FIG. 1A is a SEM image under low magnification of the conductive PDMS/SWNT-CA composite. FIG. 1B is a SEM image under high magnification of the conductive PDMS/SWNT-CA composite.

TABLE 1

Physical properties of SWNT-CA scaffold, polymers and conductive polymer composites

| Material | CNT (vol %), (wt %) | Density/ g cm$^{-3}$ | E/MPa | /S cm$^{-1}$ |
|---|---|---|---|---|
| SWNT-CA | 1, 55 | 0.028 | 1.0 | 1.12 |
| PDMS | 0, 0 | 1.04 | 4.2 | <0.001 |
| PDMS/SWNT-CA | 1, 1.2 | 1.01 | 14 | 1.00 |

This observation is supported by the fact that the electrical conductivity of the SWNT-CA scaffold is maintained even in a fully dense insulating matrix as shown by Table 1. To Applicant's knowledge, the conductivity of these polymer composites (1 S cm$^{-1}$) represents the highest conductivity reported for a polymer/SWNT composite prepared at such a low CNT loading level (1.2 wt % or 1 vol %). Interestingly, the electrical conductivity of this composite is on par with the highest reported value for a polymer/MWNT at a similar ~1 wt % MWNT loading. As SWNTs typically contain some fraction of semiconducting tubes, as compared to MWNTs, which presumably are all metallic, one might expect a higher conductivity in the MWNT composite with similar CNT loadings. This observation highlights the need for further study in this area and suggests that even larger improvements in the conductivity of polymer composites are possible.

Figure 1:
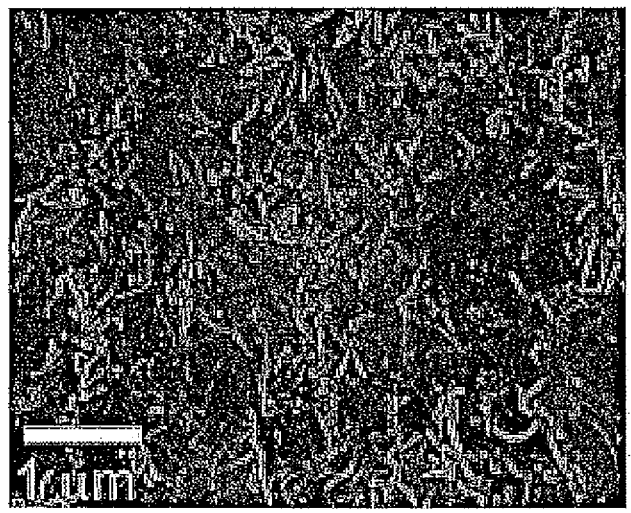
Figure 1:
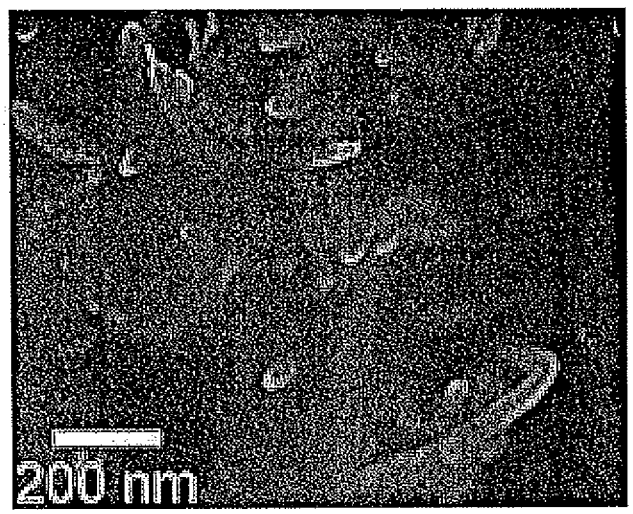
Figure 2A:
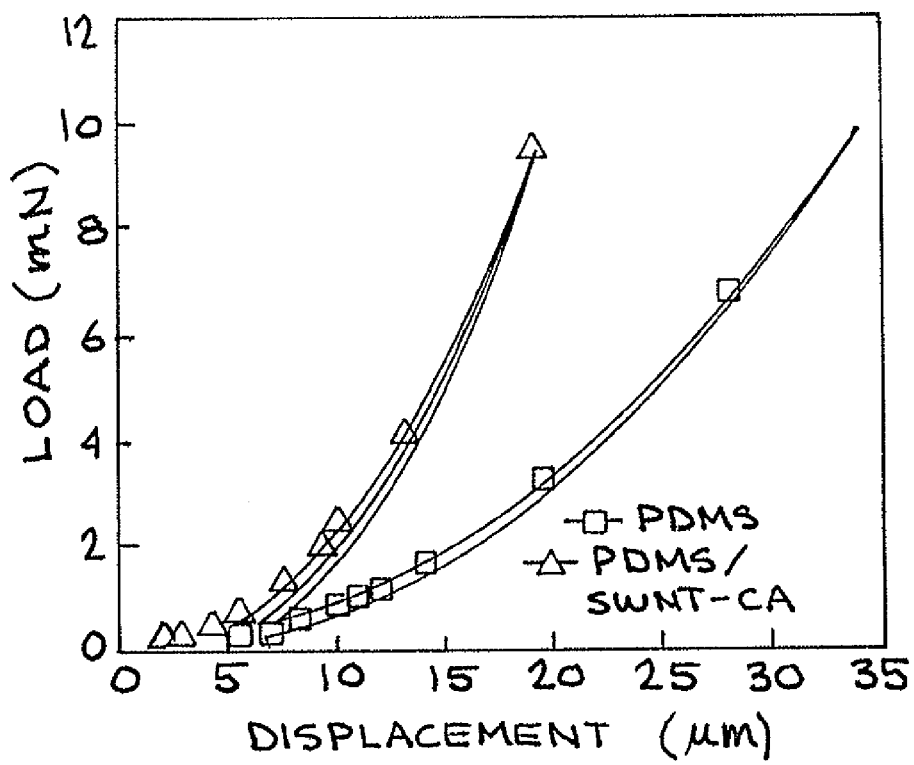
FIGS. 2A and 2B show partial load-displacement curves for PDMS and PDMS/CNT composite.
Figure 2B:
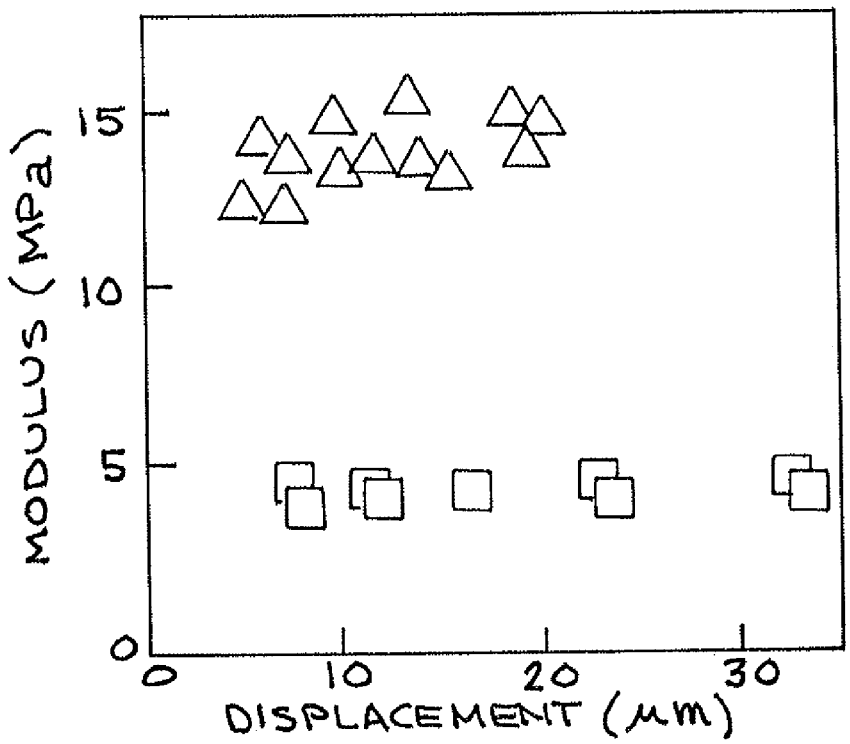

Referring now to FIGS. 2A and 2B, nanoindentation measurements show that the PDMS/SWNT-CA experiences very elastic behavior with an ~300% increase in Young's modulus as compared to the case of PDMS. The observed enhancement in modulus is consistent with the increase expected based on the Halpin-Tsai model for a nanotube bundle aspect ratio of ~100. A similar increase in modulus was observed by Dyke and Tour for a PDMS/SWNT composite prepared with 1 wt % loading of surface-functionalized SWNT. The improved modulus is also consistent with the observation of a polymer shell that coats the CNT bundles in the SEM images as shown in FIG. 1. The presence of the polymer shell suggests strong bonding at the PDMS/SWNT-CA interface, a key element in successful reinforcement. These results highlight the effectiveness of using a pre-made CNT scaffold for structural reinforcement.

Example 1

SWNT-CA nanofoams, with a SWNT loading of 55 wt % (1 vol %) and a monolith density of 28 mg cm$^{-3}$, were prepared as previously reported. Briefly, purified SWNTs were suspended in deionized water and thoroughly dispersed via sonication.

Once the SWNTs were dispersed, organic sol-gel chemistry was used crosslink the CNT bundles. Typically, organic sol-gel chemistry involves the polymerization of organic precursors to produce highly crosslinked organic gels that can be dried and pyrolyzed to yield porous carbon structures. In this case, low concentrations of the sol-gel precursors (resorcinol, formaldehyde) and catalyst (sodium carbonate) were added to the CNT suspension to induce polymerization primarily on the walls of the CNT bundles and, more importantly, at the junctions between adjacent bundles to form an organic binder.

The resulting gel was then dried and subsequently pyrolyzed to convert the organic binder to carbon, yielding the SWNT-CA nanofoam. The volume percent of SWNTs in each sample was calculated from the initial mass of SWNTs added, a CNT density of 1.3 g cm$^{-3}$, and the final volume of the sample. The synthesis process for the SWNT-CA allows for a range of possible shapes and sizes. In this report, SWNT-CA right cylinders with diameters of ~1 cm and heights of ~2 cm were fabricated.

Composites were prepared by immersing the as-prepared SWNT-CA in the PDMS polymer resin prior to cure. The immersed SWNT-CA was placed under vacuum until no more air escaped from the scaffold, suggesting full infiltration of the resin. The infiltrated SWNT-CA was then cured at 60° C. to produce the composite. The dimensions of the composite were approximately equal to those of the initial SWNT-CA.

Materials and Methods

Materials. All reagents were used without further purification. Resorcinol (99%) and formaldehyde (37% in water) were purchased from Aldrich Chemical Co. Sodium carbonate (anhydrous) was purchased from J.T. Baker Chemical Co. Highly purified SWNTs were purchased from Carbon Solutions, Inc.

SWNT-CA preparation. The SWNT-CAs were prepared using traditional organic sol-gel chemistry [1]. In a typical reaction, purified SWNTs (Carbon Solutions, Inc.) were suspended in deionized water and thoroughly dispersed using a VWR Scientific Model 75T Aquasonic (sonic power ~90 W, frequency ~40 kHz). The concentration of SWNTs in the reaction mixture was 1.3 wt %. Once the SWNTs were dispersed, resorcinol (1.235 g, 11.2 mmol), formaldehyde (1.791 g, 22.1 mmol) and sodium carbonate catalyst (5.95 mg, 0.056 mmol) were added to the reaction solution. The resorcinol-to-catalyst ratio (R/C) employed was 200. The amount of resorcinol and formaldehyde (RF solids) used was 4 wt %. The sol-gel mixture was then transferred to glass molds, sealed and cured in an oven at 85° C. for 72 h. The resulting gels were then removed from the molds and washed with acetone for 72 h to remove all the water from the pores of the gel network. The wet gels were subsequently dried with supercritical CO2 and pyrolyzed at 1050° C. under a N2 atmosphere for 3 h. The SWNT-CAs materials were isolated as black cylindrical monoliths. Foams with a SWNT loading of 55 wt % (1 vol %) were prepared by this method.

Characterization. Scanning electron microscopy (SEM) characterization was performed on a JEOL 7401-F at 5-10 keV (20 mA) in secondary electron imaging mode with a working distance of 2-8 mm. Electrical conductivity was measured using the four-probe method with metal electrodes attached to the ends of cylindrical samples. The amount of current transmitted through the sample during measurement was 100 mA, and the voltage drop along the sample was measured over distances of 3 to 6 mm. Seven or more measurements were taken on each sample, and results were averaged. Mechanical properties were studied by indentation in an MTS XP Nanoindenter with a Berkovich diamond tip. A series of both continuous and partial load-unload indents (with 5 cycles and an unloading percentage of 100% for each cycle) was carried out in laboratory air at room temperature. The loading rate was continuously adjusted to keep a constant representative strain rate of $10^{-3}$ s$^{-1}$, defined as (dPfdt)coté/4P, where P is load, t is time, and è=72.1° is the equivalent cone angle of the Berkovich tip used. For every cycle, the unloading rate was kept constant and equal to the maximum loading rate of the cycle. The Oliver-Pharr method [2] was used to analyze partial load-unload data in order to calculate the indentation elastic modulus as a function of the indenter penetration.

Example 2

SWNT-CA nanofoams, with a SWNT loading of 55 wt % (1 vol %) and a monolith density of 28 mg cm$^{-3}$, were prepared as previously reported. Briefly, purified SWNTs were suspended in deionized water and thoroughly dispersed via sonication.

Once the SWNTs were dispersed, organic sol-gel chemistry was used crosslink the CNT bundles. Typically, organic sol-gel chemistry involves the polymerization of organic precursors to produce highly crosslinked organic gels that can be dried and pyrolyzed to yield porous carbon structures. In this case, low concentrations of the sol-gel precursors (resorcinol, formaldehyde) and catalyst (sodium carbonate) were added to the CNT suspension to induce polymerization primarily on the walls of the CNT bundles and, more importantly, at the junctions between adjacent bundles to form an organic binder.

The resulting gel was then dried and subsequently pyrolyzed to convert the organic binder to carbon, yielding the SWNT-CA nanofoam. The volume percent of SWNTs in each sample was calculated from the initial mass of SWNTs added, a CNT density of 1.3 g cm$^{-3}$, and the final volume of the sample. The synthesis process for the SWNT-CA allows for a range of possible shapes and sizes. In this report, SWNT-CA right cylinders with diameters of ~1 cm and heights of ~2 cm were fabricated.

Composites were prepared by immersing the SWNT-CA in the epoxy polymer resin prior to cure. The immersed SWNT-CA was placed under vacuum until no more air escaped from the scaffold, suggesting full infiltration of the resin. The infiltrated SWNT-CA was then cured at elevated temperature of 150° C. to produce the epoxy/SWNT-CA composite.

Materials and Methods

Materials. All reagents were used without further purification. Resorcinol (99%) and formaldehyde (37% in water) were purchased from Aldrich Chemical Co. Sodium carbonate (anhydrous) was purchased from J.T. Baker Chemical Co. Highly purified SWNTs were purchased from Carbon Solutions, Inc.

SWNT-CA preparation. The SWNT-CAs were prepared using traditional organic sol-gel chemistry [1]. In a typical reaction, purified SWNTs (Carbon Solutions, Inc.) were suspended in deionized water and thoroughly dispersed using a VWR Scientific Model 75T Aquasonic (sonic power ~90 W, frequency ~40 kHz). The concentration of SWNTs in the reaction mixture was 1.3 wt %. Once the SWNTs were dispersed, resorcinol (1.235 g, 11.2 mmol), formaldehyde (1.791 g, 22.1 mmol) and sodium carbonate catalyst (5.95 mg, 0.056 mmol) were added to the reaction solution. The resorcinol-to-catalyst ratio (R/C) employed was 200. The amount of resorcinol and formaldehyde (RF solids) used was 4 wt %. The sol-gel mixture was then transferred to glass molds, sealed and cured in an oven at 85° C. for 72 h. The resulting gels were then removed from the molds and washed with acetone for 72 h to remove all the water from the pores of the gel network. The wet gels were subsequently dried with supercritical CO2 and pyrolyzed at 1050° C. under a N2 atmosphere for 3 h. The SWNT-CAs materials were isolated as black cylindrical monoliths. Foams with a SWNT loading of 55 wt % (1 vol %) were prepared by this method.

Characterization. Scanning electron microscopy (SEM) characterization was performed on a JEOL 7401-F at 5-10 keV (20 mA) in secondary electron imaging mode with a working distance of 2-8 mm. Electrical conductivity was measured using the four-probe method with metal electrodes attached to the ends of cylindrical samples. The amount of current transmitted through the sample during measurement was 100 mA, and the voltage drop along the sample was measured over distances of 3 to 6 mm. Seven or more measurements were taken on each sample, and results were averaged.

TABLE 2

| Material | CNT, vol % (wt %) | σ, Scm$^{-1}$ |
|---|---|---|
| Epoxy | 0 | <0.001 |
| Epoxy/SWNT-CA | 1 (1.2) | 1.01 |

Additional information about Applicants' invention is disclosed in the journal article, "Stiff and electrically conductive composites of carbon nanotube aerogels and polymers," by Marcus A. Worsley, Sergei O. Kucheyev, Joshua D. Kuntz, Alex V. Hamza, Joe H. Satcher, Jr., Theodore F. Baumann, in J. Mater. Chem., 2009, 19, 3370-3372. The *J. Mater. Chem.*, 2009, 19, 3370-3372, is incorporated herein in its entirety by this reference.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A method of making a stiff and electrically conductive composite of carbon nanotube aerogel and polymer, comprising the steps of:
   obtaining a single-walled carbon nanotube carbon aerogel comprising single-walled carbon nanotubes covalently crosslinked by nanoparticles from a liquid reaction mixture that comprises dispersed single-walled carbon nanotubes but does not comprise surfactant for the single-walled carbon nanotubes,
   immersing said single-walled carbon nanotube carbon aerogel in a polymer resin to produce a single-walled carbon nanotube carbon aerogel infiltrated with said polymer resin, and curing said single-walled carbon nanotube carbon aerogel infiltrated with said polymer resin to produce the stiff and electrically conductive composite of carbon nanotube aerogel and polymer.

2. The method of making a stiff and electrically conductive composite of carbon nanotube aerogel and polymer of claim 1 wherein said step of immersing said single-walled carbon nanotube carbon aerogel in a polymer resin to produce a single-walled carbon nanotube carbon aerogel infiltrated with said polymer resin includes placing said single-walled carbon nanotube carbon aerogel immersed in a polymer resin under vacuum.

3. The method of making a stiff and electrically conductive composite of carbon nanotube aerogel and polymer of claim 1 wherein said step of curing said single-walled carbon nanotube carbon aerogel infiltrated with said polymer resin to produce the stiff and electrically conductive composite of carbon nanotube aerogel and polymer comprises curing said single-walled carbon nanotube carbon aerogel infiltrated with said polymer resin at 60 to 150° C.

4. The method of making a stiff and electrically conductive composite of carbon nanotube aerogel and polymer of claim 1 wherein said step of immersing said single-walled carbon nanotube carbon aerogel in a polymer resin to produce a single-walled carbon nanotube carbon aerogel infiltrated with said polymer resin comprises immersing said single-walled carbon nanotube carbon aerogel in polydimethylsiloxane resin, and wherein said step of curing said single-walled carbon nanotube carbon aerogel infiltrated with said polymer resin comprises curing said single-walled carbon nanotube carbon aerogel infiltrated with said polydimethylsiloxane resin to produce the stiff and electrically conductive composite of carbon nanotube aerogel and polymer.

5. The method of making a stiff and electrically conductive composite of carbon nanotube aerogel and polymer of claim 1 wherein said step of immersing said single-walled carbon nanotube carbon aerogel in a polymer resin to produce a single-walled carbon nanotube carbon aerogel infiltrated with said polymer resin comprises immersing said single-walled carbon nanotube carbon aerogel in epoxy polymer resin, and wherein said step of curing said single-walled carbon nanotube carbon aerogel infiltrated with said polymer resin comprises curing said single-walled carbon nanotube carbon aerogel infiltrated with said epoxy polymer resin to produce the stiff and electrically conductive composite of carbon nanotube aerogel and polymer.

6. The method of claim 1, wherein the single-walled carbon nanotube carbon aerogel comprises at least 20 wt. % of carbon nanotubes.

7. The method of claim 1, wherein the single-walled carbon nanotube carbon aerogel comprises at least 30 wt. % of carbon nanotubes.

8. The method of claim 1, wherein the single-walled carbon nanotube carbon aerogel comprises a network of interconnected filament-like struts.

9. The method of claim 1, wherein the single-walled carbon nanotube carbon aerogel is obtained by: providing an aqueous composition comprising the dispersed single-walled carbon nanotubes; mixing said aqueous composition with at least one reactant and at least one catalyst to form the reaction mixture; and converting the reaction mixture into the single-walled carbon nanotube carbon aerogel.

10. The method of claim 9, wherein the reaction mixture comprises resorcinol and formaldehyde as reactants.

11. The method of claim 9, wherein the reaction mixture comprises sodium carbonate as catalyst.

12. The method of claim 9, wherein the converting step comprises: curing the reaction mixture to form a wet gel, drying the wet gel to produce a dry gel, and pyrolyzing the dry gel to obtain the single-walled carbon nanotube carbon aerogel.

\* \* \* \* \*